(12) United States Patent
Jagodinski et al.

(10) Patent No.: US 11,317,997 B2
(45) Date of Patent: May 3, 2022

(54) DENTAL DISPENSER

(71) Applicant: DENTSPLY SIRONA Inc., York, PA (US)

(72) Inventors: Kevin Jagodinski, Lebanon, OH (US); Kenneth Guaragno, Spring Grove, PA (US)

(73) Assignee: DENTSPLY SIRONA INC., York, PA (US)

( * ) Notice: Subject to any disclaimer, the term of this patent is extended or adjusted under 35 U.S.C. 154(b) by 0 days.

(21) Appl. No.: 16/047,117

(22) Filed: Jul. 27, 2018

(65) Prior Publication Data

US 2019/0029782 A1    Jan. 31, 2019

Related U.S. Application Data

(60) Provisional application No. 62/537,549, filed on Jul. 27, 2017.

(51) Int. Cl.
  *A61C 9/00*    (2006.01)
  *A61C 5/62*    (2017.01)
  *C08G 75/23*    (2006.01)

(52) U.S. Cl.
  CPC .............. *A61C 9/0026* (2013.01); *A61C 5/62* (2017.02); *C08G 75/23* (2013.01)

(58) Field of Classification Search
  CPC .. A61C 9/0026; C08G 75/23; A61M 5/31581; A61M 5/24; A61M 5/1454; A61M 5/31511; A61M 5/14526; A61M 2205/6081; A61M 2005/2496; A61M 2005/2407; A61M 3/00; A61M 5/1785; A61M 5/1782; A61M 2005/2488; A61M 2005/2507; A61M 2005/3139
  USPC .............. 433/90, 80, 89; 604/220, 233, 207; 401/171
  See application file for complete search history.

(56) References Cited

U.S. PATENT DOCUMENTS

| | | | | |
|---|---|---|---|---|
| 1,737,857 A | | 12/1929 | MacGregor | |
| 1,971,687 A | * | 8/1934 | Kratz | A61M 5/24 604/233 |
| 3,214,207 A | * | 10/1965 | Swanson | E05C 19/145 292/66 |
| 3,480,014 A | * | 11/1969 | Callahan | A61M 5/24 604/506 |
| 4,973,248 A | * | 11/1990 | Sigler | B05C 17/00593 433/90 |

(Continued)

FOREIGN PATENT DOCUMENTS

| | | |
|---|---|---|
| BE | 515066 A | 7/1954 |
| DE | 1093051 B | 11/1960 |

(Continued)

OTHER PUBLICATIONS

International Search Report; PCT/US2018/044029; Dec. 12, 2018 (completed); dated Jan. 3, 2019.

(Continued)

*Primary Examiner* — Nicholas D Lucchesi
*Assistant Examiner* — Mirayda A Aponte
(74) *Attorney, Agent, or Firm* — Dentsply Sirona Inc.

(57) ABSTRACT

A dental dispenser that receives a cartridge and a blunt tip applicator for the safe and controlled extrusion and placement of dental materials such as non-injectable anesthetics.

13 Claims, 13 Drawing Sheets

(56) References Cited

U.S. PATENT DOCUMENTS

| | | | | |
|---|---|---|---|---|
| 5,176,657 A | * | 1/1993 | Shields | A61M 5/24 |
| | | | | 604/192 |
| 5,722,829 A | * | 3/1998 | Wilcox | A61C 9/0026 |
| | | | | 222/137 |
| 5,807,334 A | * | 9/1998 | Hodosh | A61M 5/20 |
| | | | | 604/131 |
| 5,964,736 A | * | 10/1999 | Lane | A61M 5/31581 |
| | | | | 604/207 |
| 6,719,736 B2 | | 4/2004 | Collins | |
| 2005/0154354 A1 | | 7/2005 | Kawasaki | |
| 2012/0199549 A1 | | 8/2012 | Kawamura | |
| 2013/0296235 A1 | | 11/2013 | Alarcon | |
| 2016/0354326 A1 | | 12/2016 | Uzbelger Feldman | |

FOREIGN PATENT DOCUMENTS

| | | |
|---|---|---|
| EP | 0970717 A1 | 1/2000 |
| WO | 2017011895 A1 | 1/2017 |

OTHER PUBLICATIONS

Written Opinion of the International Searching Authority; PCT/US2018/044029; Dec. 12, 2018 (completed); dated Jan. 3, 2019.
International Preliminary Report on Patentability; PCT/US2018/044029; Dec. 12, 2018 (completed); dated Jan. 3, 2019.

\* cited by examiner

DENTAL DISPENSER

FIELD

The present disclosure relates generally to a dental dispenser and more specifically to a dental dispenser said dental dispenser removably engaging with a cartridge and a blunt tip applicator for the extrusion and placement of dental materials such as non-injectable anesthetics.

BACKGROUND

It is known in the dental art to provide dental tools such as syringes with pre-loaded cartridges for injecting fluid medications safely and to make such practices more compliant with modern infection control precautions, through means such as for example, permanently attached leading needles with tips that are kept sterile before use by thin elastomeric scabbards.

It is beneficial to provide such devices with various features such as safe and effective handling and gripping, extrusion control, ability to restrict certain cartridges from insertion, or the like. When the dental professional is manipulating such devices, it often proves difficult to efficiently handle the tools for long periods of time due to length and weight restrictions, inability to swivel as well as grip style and cartridge containment. Moreover, available dispensers are limited in their ability to confine inserted cartridges and interface with blunt tip applicators for spill-free extrusions.

U.S. Pat. No. 5,176,657 describes making syringes with preloaded cartridges safer for medical use.

US Patent Application Publication No. 2005/0154354 discloses a cartridge syringe, a cartridge, and an ophthalmologic syringe set equipped with the cartridge syringe, wherein the cartridge syringe is adapted such that the cartridge syringe can be used repeatedly by exchanging and discarding only the cartridge containing an ophthalmologic therapeutic agent after use.

US Patent Application Publication No. 2016/0354326 discloses improved local anesthetic solutions for dental and/or contrast media use.

U.S. Pat. No. 6,719,736 discloses a dental syringe system with a syringe body containing a needle assembly wherein the syringe body serves as a protective shield after medication is injected. A reusable plunger assembly pushes a slidable seal and the needle out for medication delivery and then pulls the needle back within the syringe body after the medication is delivered.

In International Patent Publication No. WO2017/011895, Magne et al disclose a combination comprising a syringe and a single unit, hingeless shroud fitted around the syringe, with the syringe comprising a housing with an opening for accepting a carpule, a finger grip, a plunger with a thumb ring and a needle hub and the shroud being used to mask the dental syringe to create a more patient friendly syringe.

SUMMARY

It is desirable in many uses to provide an improved dispenser for use with cartridges containing such dental materials such as lidocaine and prilocaine periodontal gel. The disclosure relates to a device, comprising a luer body with a proximal end and a distal end, the luer body having a window disposed therein, a blunt tip applicator receiving portion at the distal end and operably engaging with a grip at the proximal end wherein the grip further operably engages with a back, said back containing a collar and receiving a rod ring such that movement of said rod ring is confined to be pushed forwards or pulled backwards with one thumb of a user. The device may also include a retainer, allowing for swivel movements of the luer body relative to the grip. The rod ring may further swivel relative to the back and collar. The back may also be hingedly connected to the grip with means such as a rivet allowing the dispenser to be turned to an open position when the rod ring is fully pulled out and the rod ring and back are turned away from the plane of the luer body for cartridge insertion. A tab may also be hingedly connected to the grip with means such as a rivet and a torsion spring to confine movement of the back when the dispenser is in a closed position wherein the rod ring, back and luer body are collinear. This will provide enhanced delivery for the precise placement of dental materials.

There has thus been outlined, rather broadly, some of the features of the device in order that the detailed description thereof may be better understood, and in order that the present contribution to the art may be better appreciated.

In this respect, before explaining at least one embodiment of the disclosure in detail, it is to be understood that the disclosure is not limited in its application to the details of construction or to the arrangements of the components set forth in the following description or illustrated in the drawings. The device is capable of other embodiments and of being practiced and carried out in various ways. Also, it is to be understood that the phraseology and terminology employed herein are for the purpose of the description and should not be regarded as limiting.

An object is to provide a dispenser with a secure controllable grip wherein the shape of said grip substantially matches the radius of curvature of fingers holding it.

An object is to provide a method of operating a dispenser wherein a window of the dispenser allows the user to see the movement of a bubble in an inserted cartridge to determine the viscosity of the dental material in the cartridge and to ensure that the dental material in the cartridge has not gelled.

An object is to provide a safe method of operating a dispenser wherein a cartridge is loaded into the dispenser from the rear of the dispenser rather than from its side.

Yet another object is to provide a safe method of use of a dispenser with a blunt tip applicator and a cartridge. Said blunt tip applicator may prevent injection of dental anesthetic through tissue.

Another object is to provide a dispenser operated by pushing one thumb on a rod ring when the dispenser is in a closed position.

Another object is to provide a dispenser that allows easy insertion of a cartridge when a thumb activated tab operably disengages with the back of the dispenser to place the rod and back in an open position.

Another object is to provide a dispenser with a back including a compression spring and a collar wherein an inserted cartridge is centered and kept in a stable condition by a compression force exerted on said inserted cartridge by the compression spring, collar and tip of the rod ring as well diameter and shape of the internal channel of the luer body, when the dispenser is in a closed position.

Another object is to provide a dispenser that is autoclavable.

Yet another object is to provide a dispenser that is sterilizable by total immersion.

Another object is to provide a dispenser with a retaining latch designed such that when said dispenser, in a closed position, is dropped, the dispenser remains closed.

Another object is to provide a dispenser with a luer body that swivels relative to the dispenser grip and a rod ring that swivels relative to the dispenser back.

Yet another object is to provide a dispenser with a safe and hygienic assembly of a blunt tip applicator and cartridge wherein a distal end of a luer body of said dispenser receives said blunt applicator and wherein said blunt tip applicator is loaded on the distal end of said luer body from outside said the luer body before said cartridge is loaded into a channel of said luer body. Herein, the blunt tip applicator may also have a sharp tipped end covered by a protective tray, wherein said sharp tipped end may be inserted into the distal end of said luer body and twisted until fully seated. A cartridge may be inserted into a channel of said luer body, said cartridge being pierced by the sharp tipped end when the cartridge is closed to form a flow path for dental material extrusion.

Another object is to provide a dispenser comprising a rod ring with a rounded tip wherein said rounded tip has a circumference smaller than an inner circumference of the cartridge housing, wherein said tip may advance freely in the cartridge with minimal force to eject fluid contents of the cartridge without breaking or shattering the cartridge housing during extrusion and during withdrawal of the tip from the cartridge after extrusion. Said tip of the rod ring may engage with a plunger of the cartridge to effect extrusion.

Other objects and advantages of the present disclosure will become obvious to the reader and it is intended that these objects and advantages are within the scope of the present disclosure. To the accomplishment of the above and related objects, this device may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present disclosure will become fully appreciated as the same becomes better understood when considered in conjunction with the accompanying drawings, in which like reference characters designate the same or similar parts throughout the several views, and wherein.

DETAILED DESCRIPTION

Turning descriptively to the drawings, in which similar reference characters denote similar elements throughout the several views, the figures illustrate a dental dispenser for the extrusion and precise placement of dental materials. Referring to the accompanying drawings, particularly, FIGS. 1, 2 and 12 herein, the dispenser comprises a luer body 111 with a proximal end and a distal end, the dispenser generally indicated by reference number 100. The dispenser 100 further comprises a rod ring 107 with a first end and a second end, the first end generally forming an handle which receives the thumb of a user and the first end forming a tip 121 which engages with a plunger (not shown) of a cartridge (not shown) to eject dental material (not shown) from said cartridge. The tip 121 may be rounded to allow free advancement of the tip 121 in an inserted cartridge with minimal force. This prevents drawbacks in prior devices such as breaking or shattering the cartridge housing, for example a glass cartridge housing, during extrusion and during withdrawal of the tip from the cartridge after extrusion. Said tip 121 of the rod ring may engage with a plunger of the cartridge for extrusion.

Figure 1:
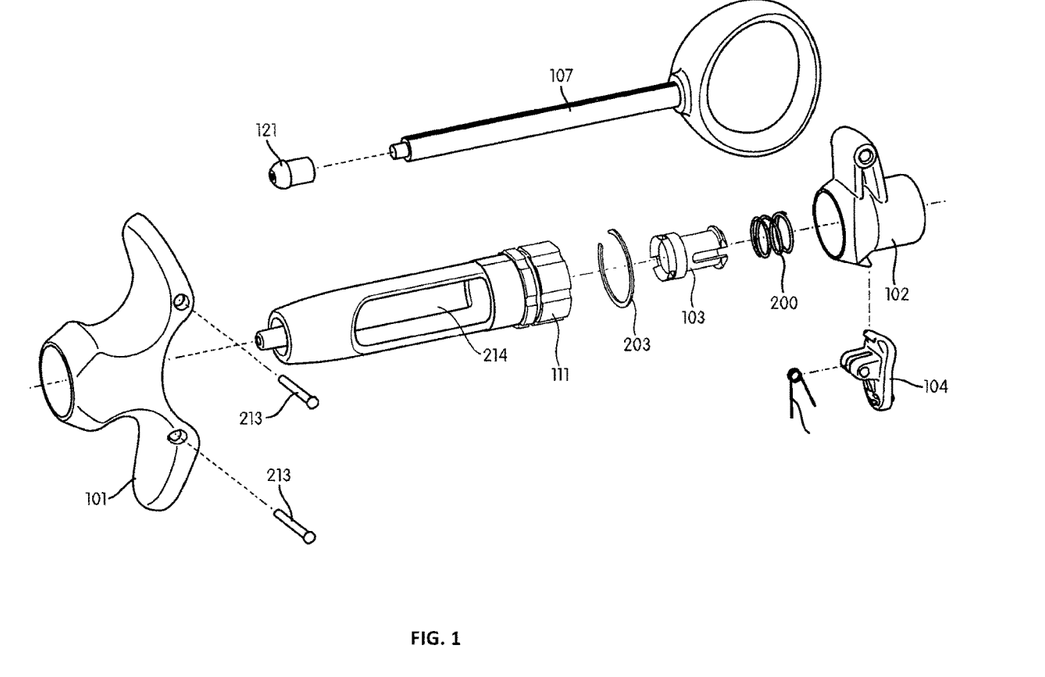
FIG. 1 is an exploded view of a dispenser according to the present disclosure.
Figure 2:
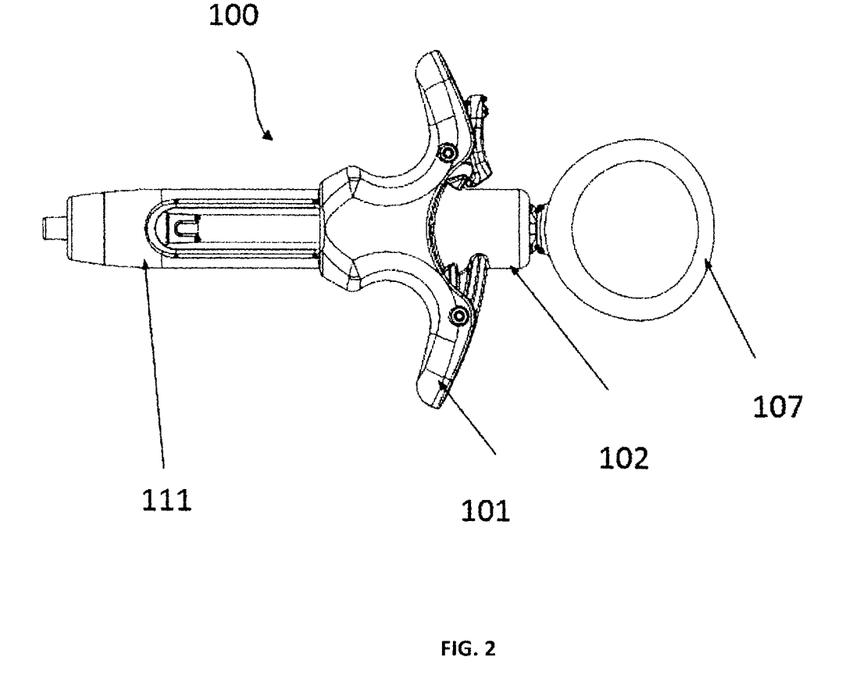
FIG. 2 is a side view of a dispenser according to the present disclosure.
Figure 3:
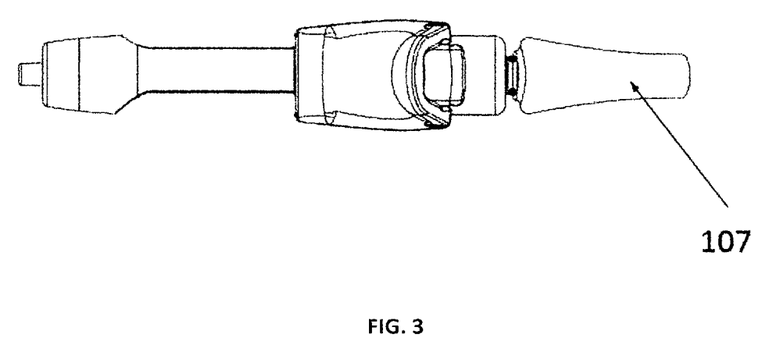
FIG. 3 is a bottom view of a dispenser according to the present disclosure.
Figure 4:
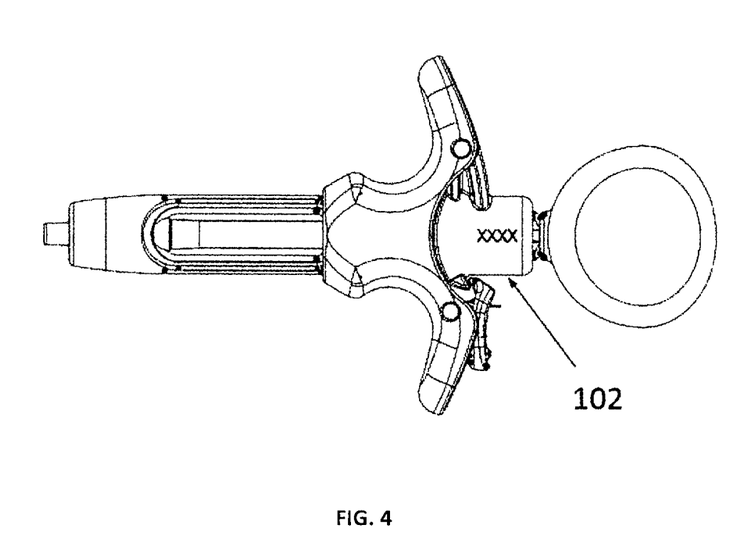
FIG. 4 is another side view of an embodiment of the present disclosure showing the dispenser back.
Figure 5:
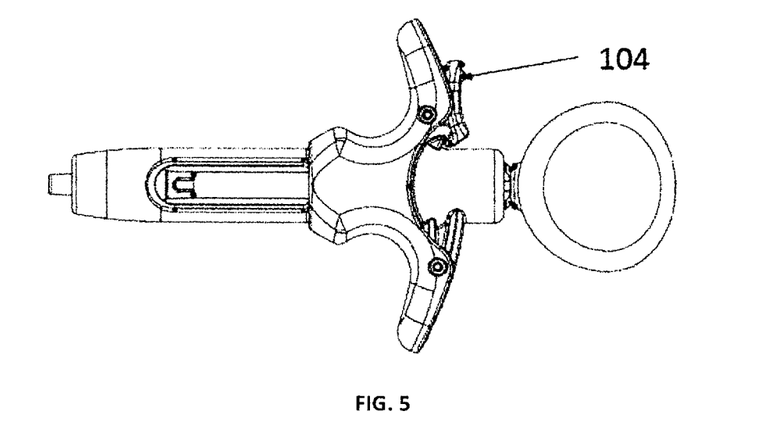
FIG. 5 is a side view of an embodiment of the present disclosure illustrating the dispenser tab.
Figure 12:
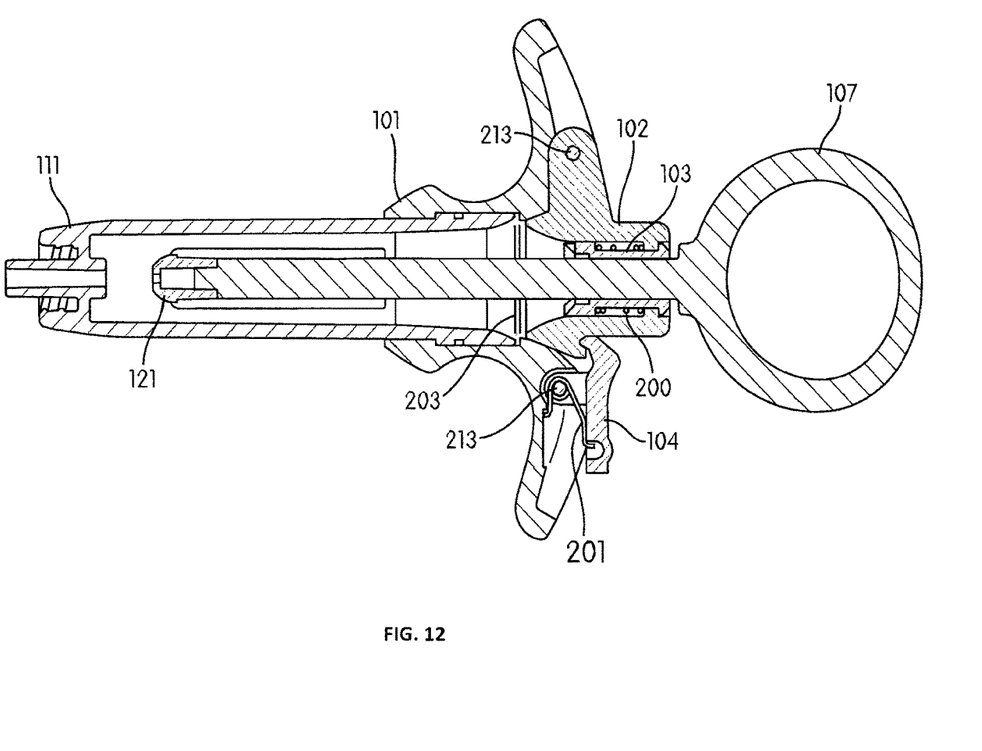
FIG. 12 is a cross sectional side view of an embodiment of the present disclosure.

The dispenser luer body 111 further comprises a window 214 disposed therein, a blunt tip applicator receiving portion 216 at its distal end and operably engaging with a grip 101 at its proximal end wherein the grip 101 further operably engages with a back 102, said back 102 containing a collar 103 and receiving said rod ring 107 such that movement of said rod ring 107 is confined to be pushed forwards or pulled backwards with one thumb (not shown) of a user. The device 100 may also include a retainer 203, allowing for swivel movements of the luer body 111 relative to the grip 101 to adjust for hand positioning. The rod ring 107 may further swivel relative to the back 102 and collar 103. The back 102 may also be hingedly connected to the grip 101 with means such as a rivet 213 allowing the dispenser 100 to be turned to an open position when the rod ring is fully pulled out and the rod ring 107 and back 102 are turned away from the plane of the luer body 111 for cartridge insertion. A tab 104 may also be hingedly connected to the grip 101 with means such as a rivet 213 and a torsion spring 201 to restrict movement of the back 102 when the dispenser 100 is in a closed position wherein the rod ring 107, back 102 and luer body 111 are collinear.

In an embodiment, the dispenser grip 101 has a finger receiving end on each side wherein each end has a concave profile such that the concavity matches the shape of a finger, thus forming a secure controllable grip.

Figure 11:
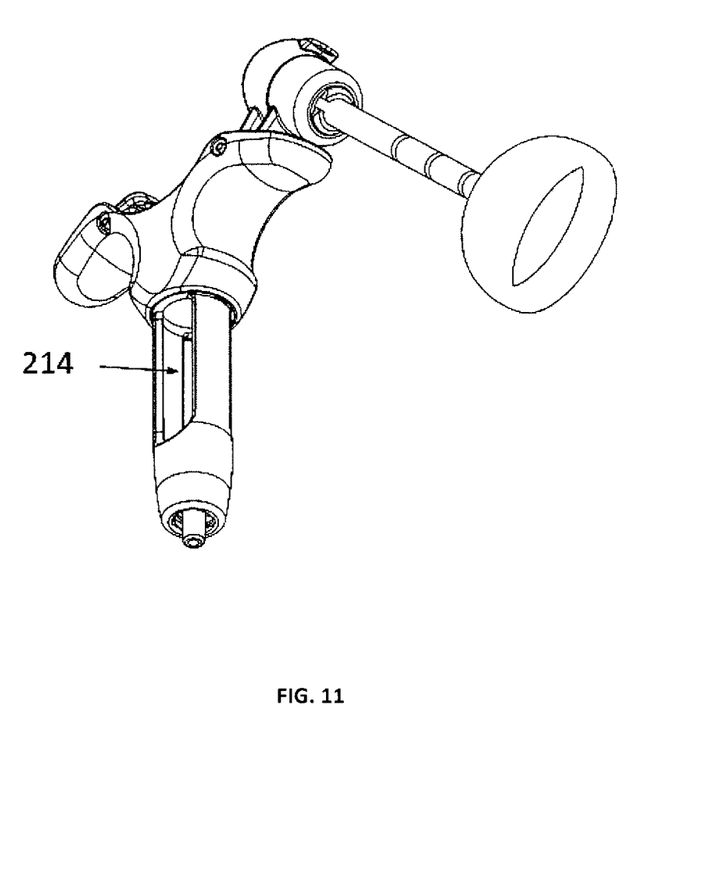
FIG. 11 is another perspective view of an embodiment of the disclosure in an open position illustrating a window of the dispenser luer body.

In another embodiment, as shown in FIG. 11, windows 214 may be formed in the luer body 111. Such a window will allow a user to see the movement of a bubble (not shown) in an inserted cartridge to determine the viscosity of dental material in said cartridge.

Figure 6:
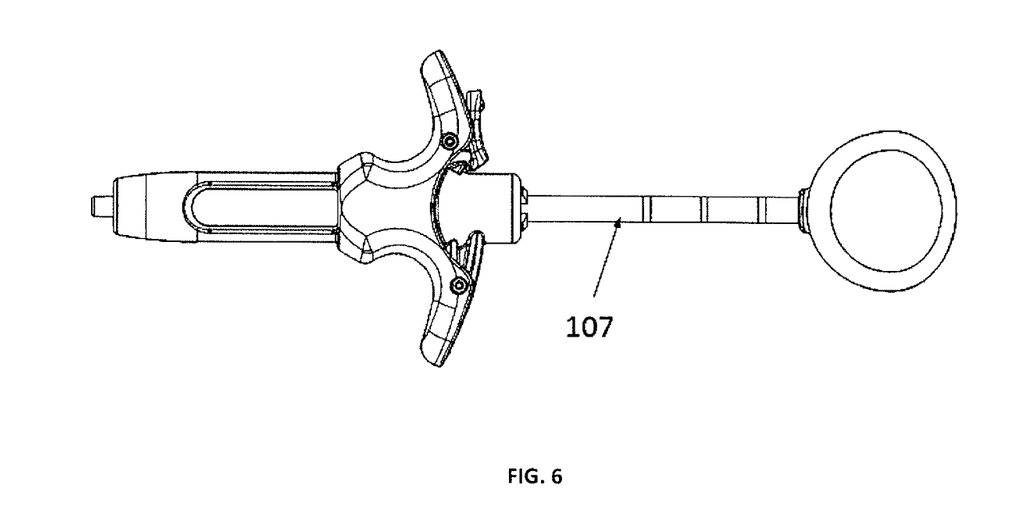
FIG. 6 is a side view of an embodiment of the present disclosure showing the rod pulled backwards.
Figure 7:
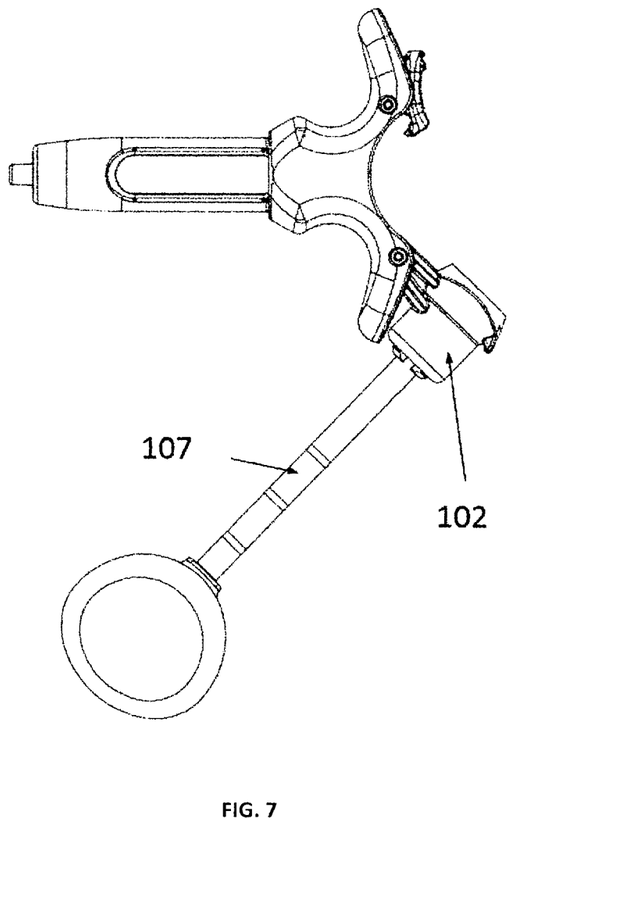
FIG. 7 is a side view of an embodiment of the present disclosure showing the rod and dispenser back pulled backwards therein placing the dispenser placed in an open position.
Figure 8:
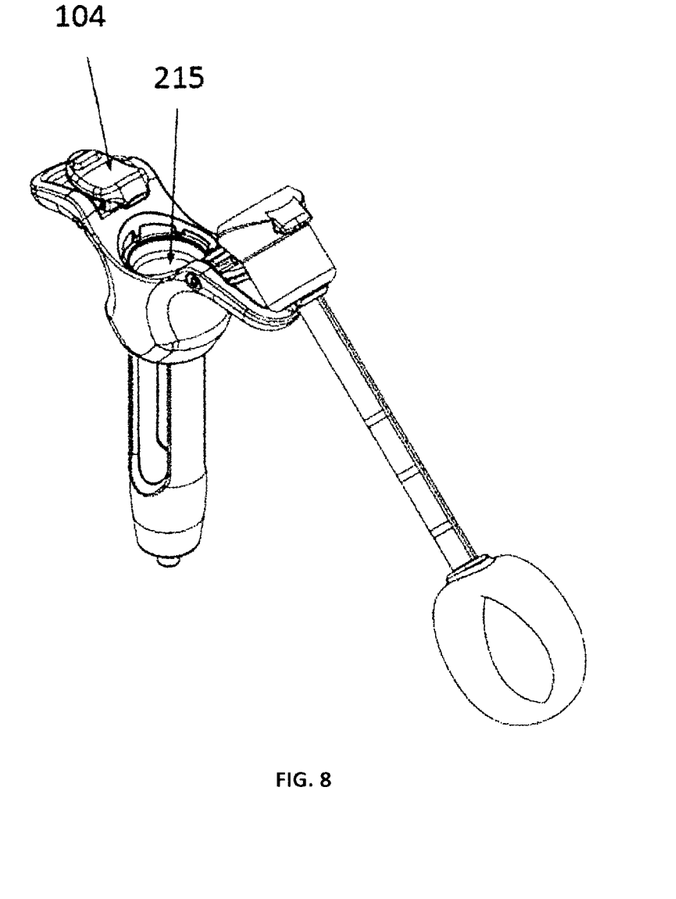
FIG. 8 is a perspective view of an embodiment of the disclosure illustrating a cartridge receiving channel the dispenser luer body.

With particular reference to FIG. 8, the dispenser may have a tab 104 which snaps back under spring pressure exerted by spring 201. The tab 104 may form a hinged latch mechanism which may be open with a single press of a finger. When the dispenser is in an open position, a suitable cartridge may be inserted into the channel 215. The dispenser rod 107 and back 102 may then be aligned with the luer body 111 as in FIG. 6 by pressing the tab 104, turning the rod 107 and back 102 to be in the same plane as the luer body 111 and releasing the tab 104 to snap over the back 102 when closed 303 to hold the back 102 in place. The back 102 may swing clear 302 off the tab 104 when open. The luer body 111 may swivel under pressure relative to the grip as shown in 304 to accommodate the hand positioning. The channel 215 may have a circumference/diameter and shape such that only compatible cartridges having a predetermined size and/or shape may be inserted. For example the dispenser channel may be shaped to receive only non-injectable anesthetic cartridges such as Oraqix. Larger diameter cartridges may be prevented from insertion and smaller diameter incompatible cartridges may be unstable inside the channel 215 upon insertion. Herein, the dispenser channel will reject the insertion of incompatible cartridge types making it safer for dental use. In an embodiment, the distal end of the channel 215 may be formed as the negative of the collar (not shown) of a cartridge in order to receive, centrally position, and confine the cartridge in the dispenser channel. In another embodiment, the proximal end of the channel may have a first circumference such that cartridges with an outer circumference larger than said first circumference cannot be inserted.

Figure 9:
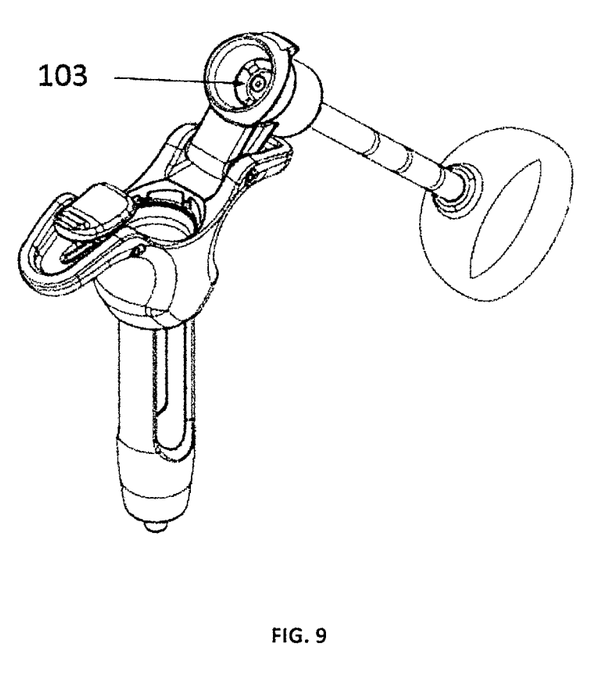
FIG. 9 is a perspective view of an embodiment of the disclosure in an open position illustrating a collar of the dispenser which resides in the dispenser back.
Figure 10:
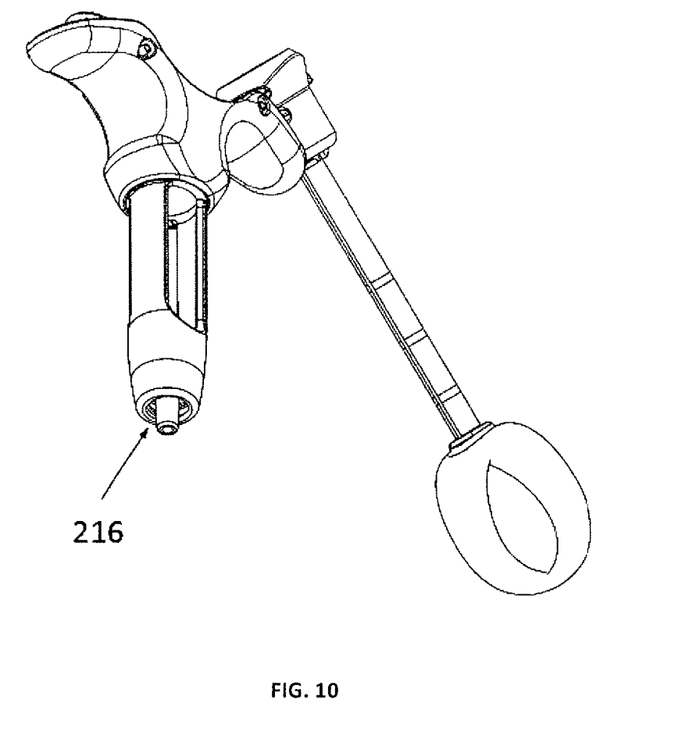
FIG. 10 is a perspective view of an embodiment of the disclosure in an open position illustrating a distal end of the dispenser luer body which receives an applicator for extruding dental material.

In another embodiment, the dispenser back 102 may have a compression spring 200 and a collar 103 (FIG. 9), said compression spring and collar exerting a compression for on an inserted cartridge when the dispenser is closed and aiding in centering and stabilizing said inserted cartridge during treatment. This prevents the cartridge from rattling in the channel 215. The collar 103 may also keep the rod ring 107 from falling out of the back 102.

In yet another embodiment, the dispenser may be made from high performance polymers such as polyphenylsulfone (Radel). The dispenser rivet 213, spring 200, 201 and retainer 203 may be made from stainless steel. The dispenser may be autoclavable and sterilizable by full submersion in a sterilizing agent.

Figure 13:
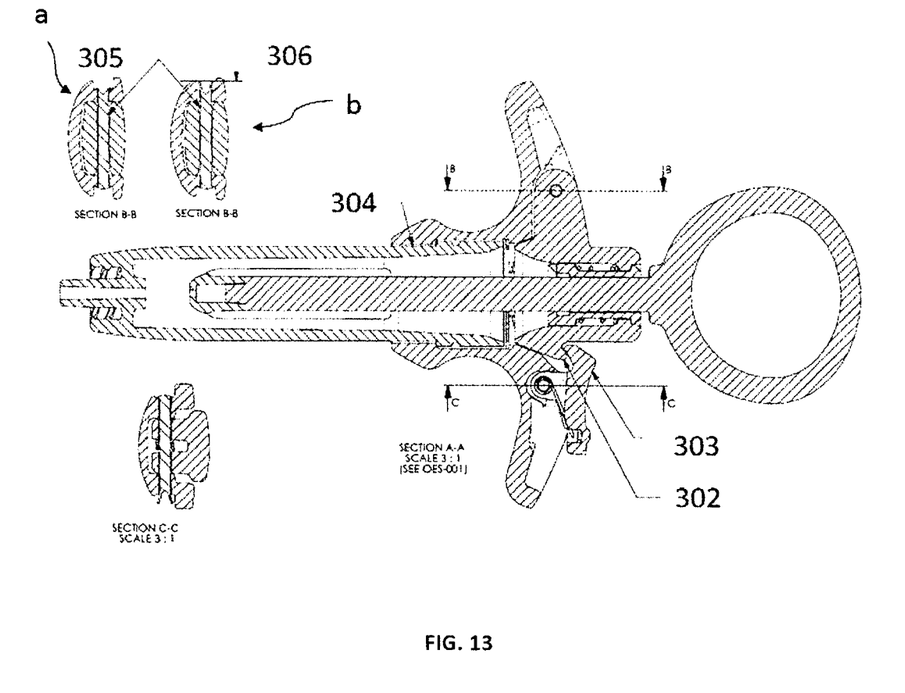
FIG. 13 is another cross sectional side view of an embodiment of the present disclosure further illustrating cross sections of the dispenser grip.

With particular reference to the embodiment in FIG. 13, showing a cross section of the dispenser, 305 shows a cross section of the grip 101 along a plane passing through rivet 213. The rivet 213 may be formed below flush 306 to and may be swaged to avoid the potential of the rivet working its way out and tearing gloves when the dispenser is in use. Item "a" shows an embodiment of the rivet post swaging and "b" shows the rivet prior to swaging.

Figure 14:
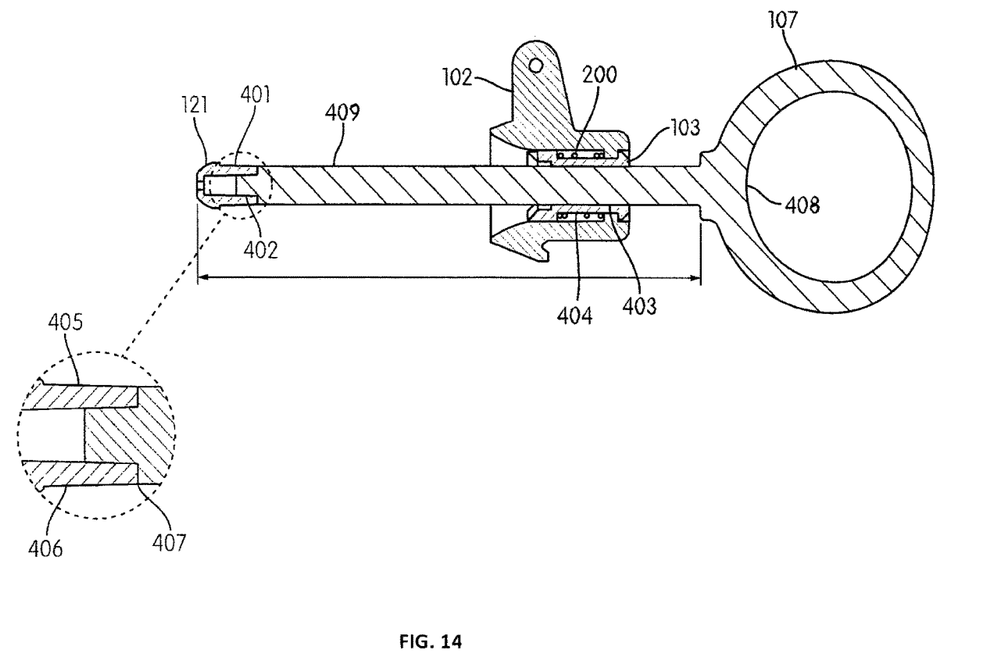
FIG. 14 is a cross sectional side view of a rod and dispenser back according to the present disclosure.

With reference to FIG. 14, the dispenser rod ring 107 comprises a tip 121 which may be centered 405 and joined to the rod ring 107 by such means as ultrasonic welding, thus forming a retention component and preventing complete removal of the rod from the dispenser. The mating joint 402 may for example hold 25 lb of load to ensure an adequate joint is formed. The rod 107 may slide freely through the collar 103 of the back 102 without binding into it. The collar 103 may also slide back without binding and may be pushed forward freely by the spring 200. During manufacturing, flash may be unacceptable beyond flush 406, 407. Flash can be a problem for aesthetics, but also it can interfere with wipe disinfection and in some cases create a very sharp feature that could be painful or capable of causing a paper-cut during handling.

Figure 15:
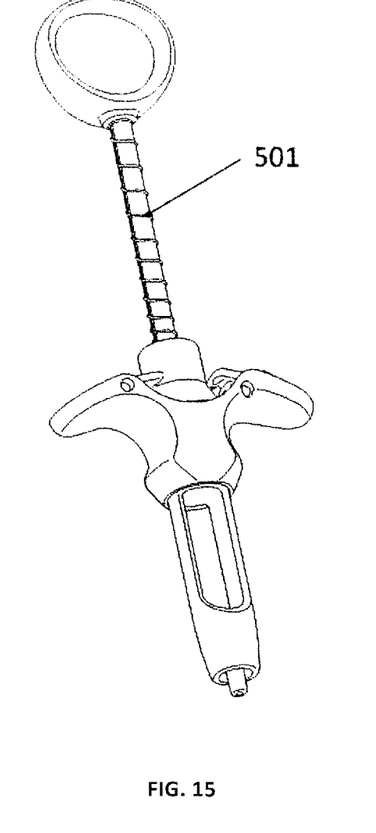
FIG. 15 is a perspective view of another embodiment of the disclosure.

In yet another embodiment, the dispenser may have a spring 501 around a distal portion of the rod ring 107, in the area between the back 102 and the handle of the rod ring 107 wherein the spring exerts a force to push the rod ring away from the dispenser back 102 to a fully extended position when the dispenser is not in use as shown in FIG. 15.

It will be appreciated from the above discussion that various embodiments of the dispenser operate in similar manners. The operation of an embodiment of the dispenser may involve placing an applicator (not shown) such as a blunt tip applicator from an Oraqix blister pack in a user's hand. The seal of the applicator is broken by twisting and removing a plastic cover from a sharp-tipped end of the applicator. Said exposed sharp-tipped end of the applicator is attached to the dispenser 100 from outside the dispenser and at a distal end of the dispenser by twisting it clockwise until the applicator is fully seated on the dispenser. The dispenser rod ring 107 is fully retracted and the tab 104 is pressed to release the latch to open the dispenser 100. A compatible cartridge (not shown) such as an Oraqix cartridge with an air bubble in it is loaded into the dispenser channel 215 until it snaps into place with an audible click, wherein the sharp tipped end of the applicator pierces the cartridge to create an extrusion flow path. The tab 104 is then pressed with a finger (not shown) and the dispenser 100 is closed before releasing the tab 104. A cap (not shown) on the blunt tip applicator can then be removed before use. Such a cap may be used to bend the applicator to improve access to periodontal pockets. The dispenser 100 may then be held vertically with the angled applicator pointed away from the user and patient (not shown). The inserted cartridge may be observed through the window 214 to confirm the dental material is of an appropriate viscosity. The air bubble may be removed by depressing the rod ring 107 to provide a more consistent flow. The dental material may then be dispensed as needed with the rod ring 107 moving freely with minimal force. After administration, the applicator may be covered with the cap and cleaned. Further, the dispenser may be disassembled by twisting the applicator with its cap counter clockwise to expose the sharp tipped end. A cover for the sharp tipped end may then be re-attached and the blunt tip applicator disposed. The cartridge may then be removed by fully retracting the rod ring 107, opening the dispenser 100, grasping the sides of the cartridge through the windows 214 and sliding the cartridge out of the dispenser 100. Those skilled in the art will recognize that the above process of handling the dispenser provides a safer and more controlled tool for periodontal use.

What has been described and illustrated herein is a preferred embodiment of the disclosure along with some of its variations. The terms, descriptions and figures used herein are set forth by way of illustration only and are not meant as limitations. Those skilled in the art will also recognize that many variations are possible within the spirit and scope of the disclosure in which all terms are meant in their broadest, reasonable sense unless otherwise indicated. Any headings utilized within the description are for convenience only and have no legal or limiting effect.

The invention claimed is:

1. A dental dispenser for dispensing dental material, comprising:
   a luer body for receiving a cartridge, the luer body having a proximal end and a distal end, the luer body further comprising an applicator receiving portion at the distal end,
   a grip, having a T shape, with a hole in a center of the grip and a finger receiving portion on each side, the grip engaging with the luer body at the proximal end via the hole, the luer body is configured to swivel, via a retainer disposed between the luer body and the grip, under pressure relative to the grip, a back, hingedly connected to the grip, and movable, separately from the grip, away from an axis of the luer body that runs through a center of the applicator receiving portion and through a center of the hole of the grip, during cartridge insertion to place the dispenser in an open position;

a tab hingedly connected to the grip and configured to snap back under spring pressure, the tab operably engages the back to place the back in a closed position in which closed position movement of the back is confined, wherein the tab is operable to disengage the tab from the back when the tab is pressed to place the back in the open position in which open position the back, together with a rod ring included in the back, swings clear off the tab;

wherein the back is configured such that the rod ring is confined to be slidably displaced with a thumb of a user in the closed position.

2. The dental dispenser of claim 1, further comprising a window disposed within the luer body.

3. The dental dispenser according to claim 1, wherein the tab is hingedly connected to the grip with a rivet and a torsion spring.

4. The dental dispenser of claim 1, wherein the rod ring is configured to swivel relative to the back.

5. The dental dispenser according to claim 1, wherein a shape of the grip is constructed to match at least a threshold radius of curvature of fingers holding the grip.

6. The dental dispenser according to claim 1, wherein the back includes a compression spring and a collar, wherein when inserted, the cartridge is centered and confined in the luer body by (i) a compression force exerted by a compression spring, (ii) a collar of the back, (iii) a tip of the rod ring, and/or (iv) diameter and shape of a channel of the luer body.

7. The dental dispenser of claim 1, wherein the dental dispenser is autoclavable.

8. The dental dispenser of claim 1, wherein the dental dispenser is sterilizable.

9. The dental dispenser of claim 1, wherein the rod ring has a rounded tip which engages with a plunger of the cartridge and wherein the rounded tip has a circumference smaller than an inner circumference of a housing of the cartridge such that the rounded tip is advanced in the cartridge to eject contents of the cartridge without breaking the housing.

10. The dental dispenser of claim 1, wherein a circumference of a channel of the luer body is configured to receive cartridges having a predetermined size or shape.

11. The dental dispenser of claim 1, wherein the dental dispenser comprises polyphenylsulfone material.

12. A dispenser assembly comprising:
a dispenser;
a cartridge; and
an applicator having a blunt tipped end at one end and a sharp tipped end at an opposite end;

wherein the cartridge is configured to be loaded into a channel of a luer body of the dispenser, wherein a distal end of the luer body of the dispenser is configured to receive the applicator, wherein the sharp tipped end of the applicator is configured to be inserted into the distal end of the luer body from outside the luer body and is further configured to be seated onto the dispenser such that when the cartridge is loaded into the channel of the luer body, the cartridge is pierced by the sharp tipped end to form a flow path for dental material extrusion and, wherein a grip of the dispenser engages with the luer body at a proximal end, the grip having a T shape, an annular center and a finger receiving portion on each side of the annular center, and the luer body is configured to swivel under pressure relative to the grip and wherein a tab is hingedly connected to the grip and configured to snap back under spring pressure, the tab operably engages a back of the dispenser to place the back in a closed position, wherein movement of the back is confined and the tab operably disengages from the back when the tab is pressed to place the back in an open position for loading the dispenser, wherein the back swings off the tab.

13. A method of safely operating a dental dispenser, the method comprising:
providing an applicator having a blunt tipped end and a sharp tipped end;
providing a dispenser having (i) a luer body for receiving a corresponding cartridge and
(ii) a rod ring for receiving a thumb of a user, the luer body having a proximal end and a distal end;
exposing the sharp tipped end of the applicator;
attaching the sharp-tipped end of the applicator to the distal end of the luer body from
outside the luer body such that the sharp tipped end is closer to an internal channel of the luer body than the blunt tipped end is;
loading the corresponding cartridge into the internal channel of the luer body such that the sharp tipped end of the applicator pierces the cartridge to create an extrusion flow path;
dispensing contents of the corresponding cartridge through the sharp tipped end to the blunt tipped end by pushing on the rod ring with a thumb;
wherein the dispenser is opened to load or remove the corresponding cartridge and closed to confine the corresponding cartridge by engaging a tab of the dispenser that is connected to the grip using one finger to snap back under spring pressure, the tab operably engages a back of the dispenser back to place the back in a closed position, wherein movement of the back is confined and the tab operably to disengages from the back when the tab is pressed to place the back in an open position for loading the dispenser, wherein the back swings off the tab.

* * * * *